A. C. V. MALM.
MACHINE FOR FORMING TUBULAR CONTAINERS.
APPLICATION FILED OCT. 7, 1918.

1,399,636.

Patented Dec. 6, 1921.
5 SHEETS—SHEET 2.

INVENTOR.
AXEL C.V. MALM.
BY Edward Reed
ATTORNEY.

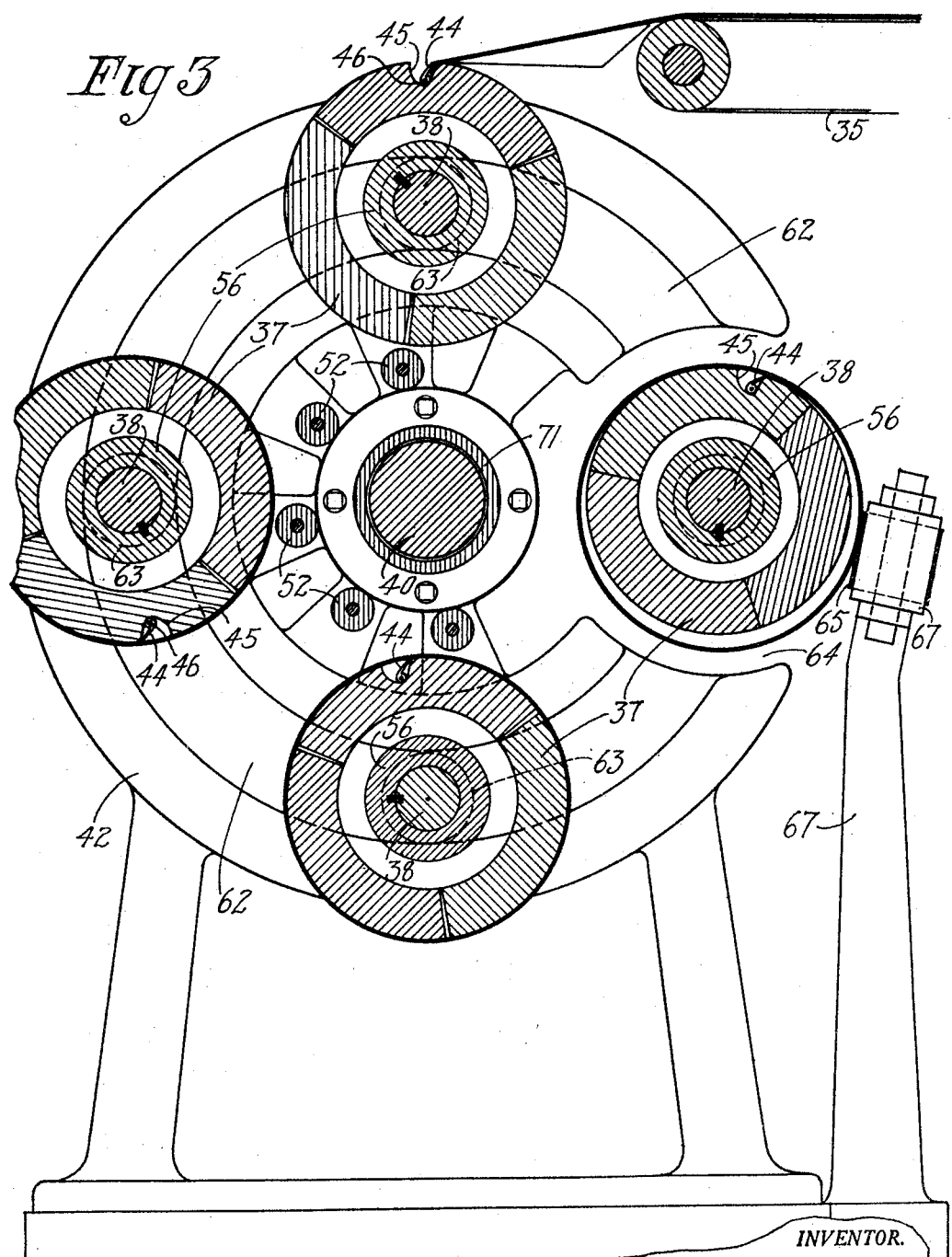

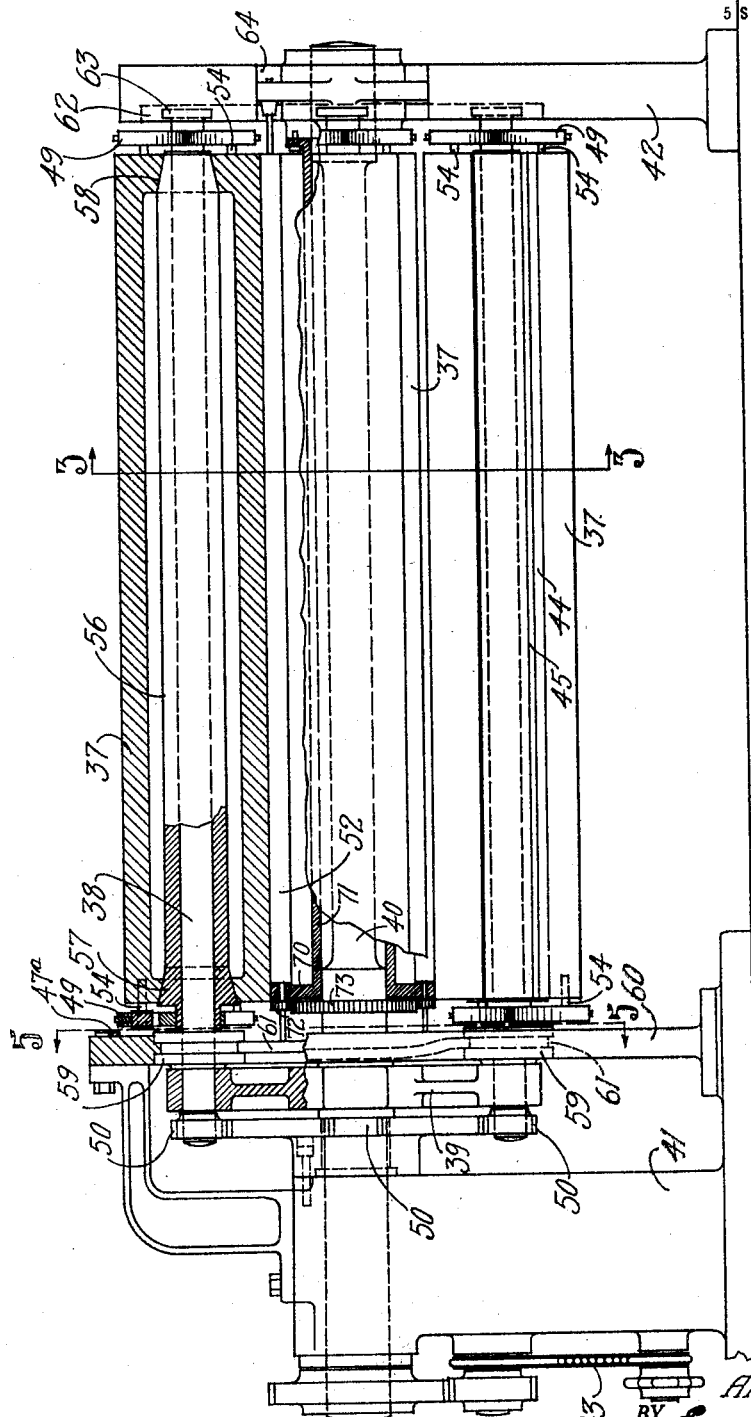

A. C. V. MALM.
MACHINE FOR FORMING TUBULAR CONTAINERS.
APPLICATION FILED OCT. 7, 1918.
1,399,636.
Patented Dec. 6, 1921.
5 SHEETS—SHEET 5.
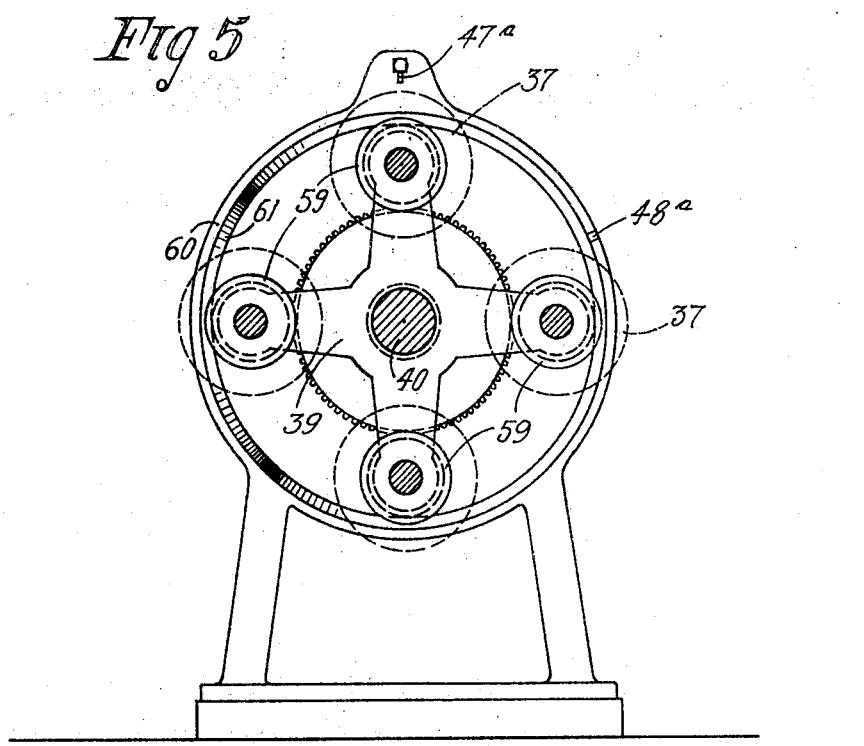
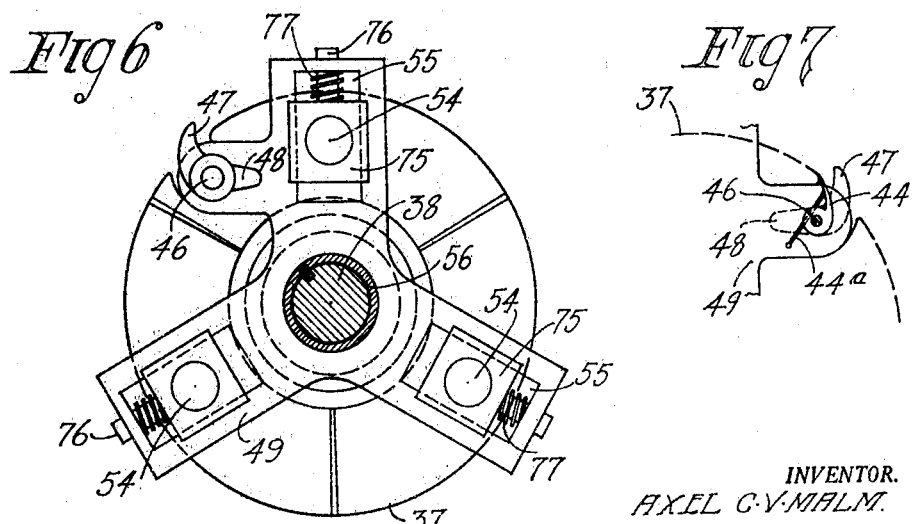
INVENTOR.
AXEL C. V. MALM.
BY
ATTORNEYS.

UNITED STATES PATENT OFFICE.

AXEL C. V. MALM, OF PHILADELPHIA, PENNSYLVANIA, ASSIGNOR TO THE PENNSYLVANIA PAPER PRODUCTS COMPANY, OF PITTSBURGH, PENNSYLVANIA, A CORPORATION OF DELAWARE.

MACHINE FOR FORMING TUBULAR CONTAINERS.

1,399,636.    Specification of Letters Patent.    Patented Dec. 6, 1921.

Application filed October 7, 1918. Serial No. 257,126.

*To all whom it may concern:*

Be it known that I, AXEL C. V. MALM, a citizen of the United States, residing at Philadelphia, in the county of Philadelphia and State of Pennsylvania, have invented certain new and useful Improvements in Machines for Forming Tubular Containers, of which the following is a specification, reference being had therein to the accompanying drawing.

This invention relates to mechanism for making tubular containers.

The object of the invention is to provide a mechanism of this kind, which will produce accurately formed tubular containers at a high rate of speed.

A further object of the invention is to provide mechanism of this kind which will operate automatically to sever a sheet of material, such as paper, from a web of such material, apply an adhesive to the surface of said sheet, wind the sheet into tubular form, and remove the same from the winding mechanism.

Other objects of the invention will appear as the mechanism is described in detail.

Figure 1:
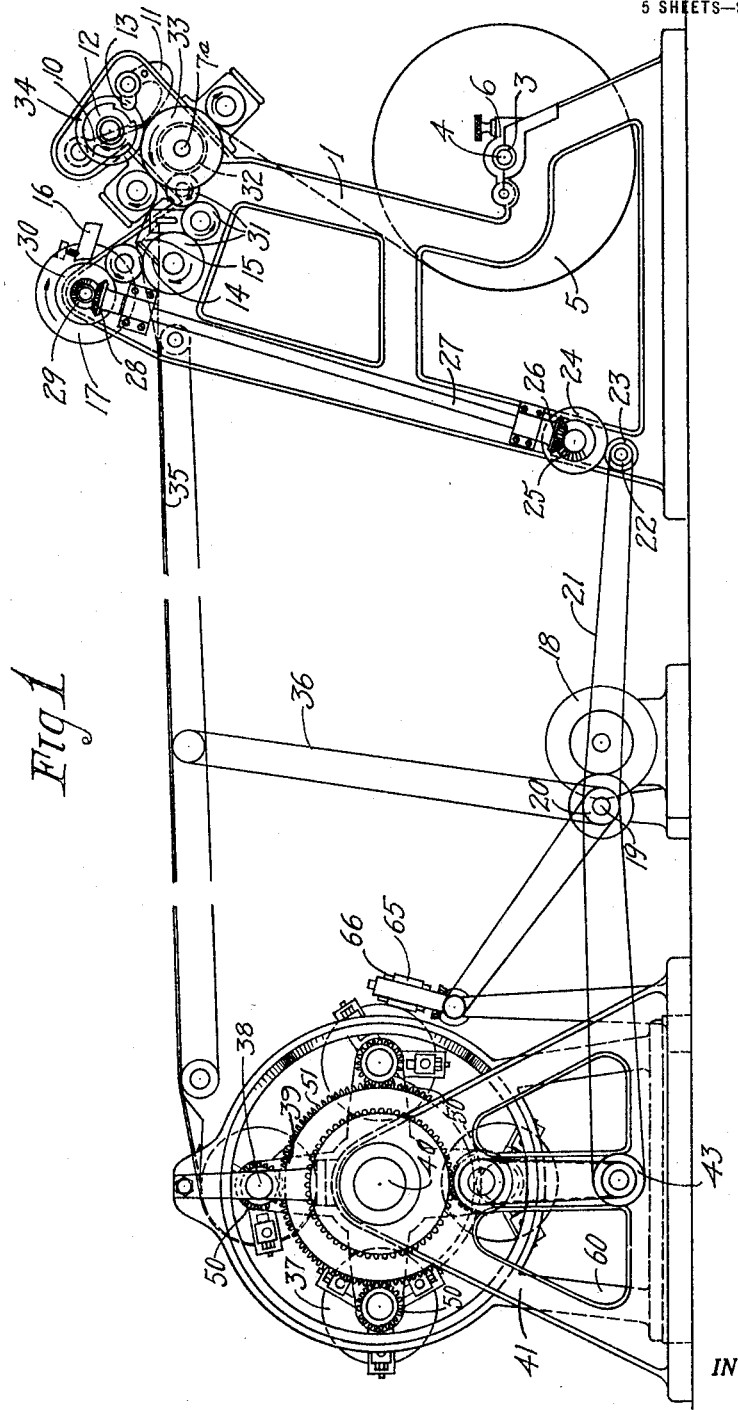
Figure 2:
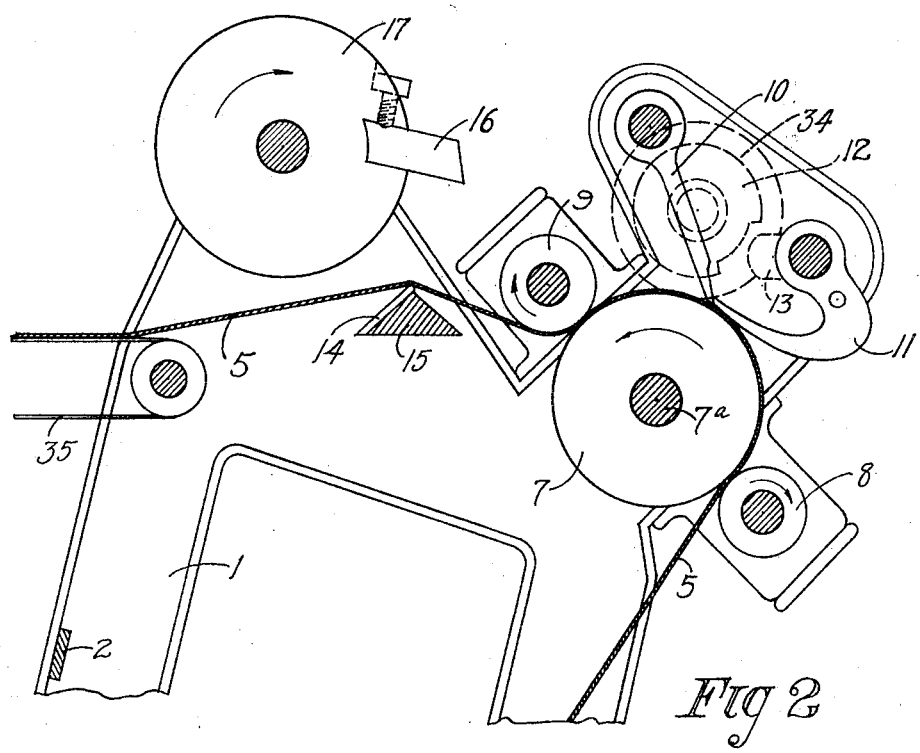
Figure 8:
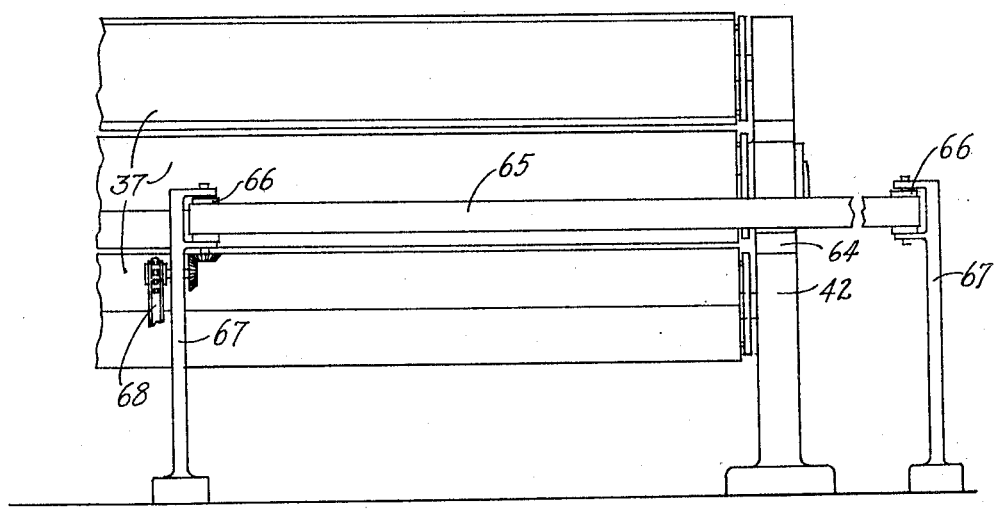

In the accompanying drawings, Figure 1 is a side elevation of a mechanism embodying my invention; Fig. 2 is a section taken just inside of the side frame member of the feeding and cement applying device; Fig. 3 is a transverse sectional view taken through the winding mechanism; Fig. 4 is a front elevation partly in section of the winding mechanism; Fig. 5 is a section taken on the line 5—5 of Fig. 4; Fig. 6 is an end elevation of one of the winding mandrels; Fig. 7 is a detail view of the gripping device; and Fig. 8 is a side elevation of the winding mechanism, partly broken away, showing the ejector.

In these drawings I have shown the invention as embodied in a mechanism designed more particularly for the production of tubular paper containers for the propellent charges for large caliber guns, but it will be understood that this particular embodiment of the invention has been chosen for the purpose of illustration only, and that containers and tubular structures of various kinds and shapes, and for various purposes, can be produced with little or no modification of the mechanism.

In carrying out my invention, I have provided mechanism for feeding a web of paper or other flexible material from a roll, severing the same into parts or sections of a predetermined length, and applying an adhesive or cement on the surface of said sheet for a portion of its length, that portion of the sheet left uncemented being substantially equal to the external circumference of the finished tube. In the particular mechanism here illustrated, the cement is applied to the web before the sheet is severed therefrom and the cutting device is so timed with relation to the cement applying device that the sheet will be severed at the rear end of the uncemented portion of the web. A conveyer takes the severed cemented sheet and delivers the same to a winding mechanism, which preferably consists of a plurality of winding elements, such as drums or mandrels, which are so actuated that the several mandrels will be brought successively into a position to receive a sheet from the conveyer. As each mandrel is brought into its sheet receiving position it grips the forward edge of the sheet and winds the same about the mandrel, each mandrel being rotated about its individual axis to cause the sheet to be wound about the same.

As the winding element or mandrel continues its bodily movement the tube into which the sheet has been wound is released from the mandrel, preferably by collapsing the latter, and the tube is then engaged by a removing device, or ejector, which moves the tube longitudinally from the mandrel, and the mandrel then continues its bodily movement into a position to receive another sheet.

In the particular embodiment of the invention here illustrated, the cementing and severing devices are mounted on a frame consisting of side members 1, connected one to the other by tie bars 2. This frame is provided with bearings 3 to receive a shaft 4 on which a roll of paper or other flexible material 5 may be mounted, and the bearings are preferably provided with clamping members 6 which may be caused to exert frictional resistance to the rotation of the shaft 4 and thus retard the movement of the roll 5 to prevent the web of paper from being unwound faster than it is fed forward by the feeding device. The web of paper is carried from the roll about a drum 7 journaled in the side members of the frame, and between the drum and the two pressure rollers 8 and 9 which hold the web in contact with the drum. The several plies or windings of the tubular container are preferably cemented one to the other, and to this end an adhesive is applied to the surface of the sheet before it is delivered to the winding device. In the present instance I have employed a rubber cement, but it will be understood that any suitable adhesive may be used, and that the term "cement", as herein used, is intended to include any adhesive which may be applied in the manner set forth. This cement is preferably applied to one surface only of the sheet, and in the present construction I apply the cement to the sheet before it is severed from the web. To this end I have provided, adjacent to the feeding device, a cement applying device which consists of a blade 10 extending transversely of the web and having its lower edge arranged close to, but spaced a short distance from, the upper surface of the web of paper, as it passes about the drum 7. A quantity of the cement is deposited upon the sheet along the edge of the blade 10 where the paper is supported by the drum. The blade extends the full width of the sheet and as the sheet is fed forward a thin layer of the cement will be carried with the sheet beneath the blade, the thickness of this layer of cement corresponding to the distance that the edge of the blade is spaced from the surface of the paper, which in the present embodiment is about .005 of an inch. It is of course, not desirable that the outer surface of the finished tube shall be coated with the cement, and I have therefore provided the cement applying device with controlling means which will cause the cement to be applied only to that portion of the sheet which forms the inner plies of the tube. In the present instance the tube will comprise substantially 5 plies of the paper, and I have, therefore, so constructed the mechanism that the cement will be applied to the surface of the sheet for approximately $\frac{4}{5}$ of its length, and inasmuch as the cement is here applied to the upper surface of the sheet, which forms the outer surfaces of the several plies of the tube, I apply the cement to the forward portion of the sheet and leave the rear portion of the sheet uncemented.

To control the application of the cement to the sheet I employ a fountain 11 which is here shown in the form of a trough-shaped member extending transversely of the web and pivotally mounted at its upper edge between the side members 1 of the supporting frame. The arrangement of the fountain is such that the lower edge thereof will lie close to the surface of the paper when the fountain is in its operative position and, when the fountain is not in its operative position, will lie close to the face of the blade 10 a short distance above the surface of the paper. The mass of cement is carried in the trough-like fountain and the shape of the fountain is such that when it is in its normal or operative position the cement will flow forward onto the web and will be carried by the web against the blade 10. When the fountain is swung forward into its inoperative position, the edge of the fountain will gather up the mass of cement and lift the same out of engagement with the web of paper, so that no cement will be applied to the paper so long as the fountain is in its inoperative position. A suitable controlling device automatically actuates the fountain to cause the cement to be applied to the desired portion only of the web of paper. This controlling device may be of any suitable character, but I prefer to provide a cam 12 arranged to coöperate with a finger 13 rigidly connected with the fountain. The cam is so placed that it will engage the finger 13 and hold the fountain in its retracted or operative position for such period of time as it is desired to apply the cement to the web of paper, and will then pass out of engagement with the finger 13 and permit the fountain to swing into its inoperative position, in which position its forward edge is in engagement with the blade 10. The fountain may be swung into its inoperative position by any suitable means, but in the form here illustrated the shape and arrangement of the fountain are such that, when released by the cam, it will move by gravity into its inoperative position.

After the web of paper leaves the feeding and cementing devices, it is acted upon by a suitable cutting device which separates it into sheets of the desired length. In that form of the mechanism here illustrated the cutting device comprises a fixed blade 14 extending transversely to the line of travel of the web, and preferably mounted upon a triangular supporting bar 15, so that the blade sets at an inclination to the vertical. Coöperating with the fixed blade 14 is a movable blade 16 which is here shown as extending lengthwise of a drum 17 which is rotatably mounted in the side members 1 of the supporting frame. The movement of the rotatable cutter 16 is so timed with relation to the feeding and cement applying devices that the web will be divided into sheets of the desired length, and that each sheet will have a portion of its surface coated with cement and another portion thereof free from cement and, as has been explained, in the present instance, the web is cut near the rear end of the uncemented portion thereof, so that the uncoated part of the sheet will be at the rear end thereof.

The several parts of the mechanism so far described may be driven in any suitable manner, and from any suitable source of power. In the present construction I have mounted an electric motor 18 in front of the supporting frame 1 and have geared this motor to a counter-shaft 19 having a sprocket wheel 20 which is connected by a drive chain 21 with a sprocket wheel 22, mounted on one of the side frame members, and having secured thereto a gear 23 which meshes with a second gear 24 also mounted on the side member of the frame. Rigidly connected with the gear 24 is a beveled gear 25 with which meshes a second beveled gear 26 which is rigidly secured to a shaft 27 having on its opposite end a beveled gear 28 which meshes with a beveled gear 29 on the shaft of the drum 17 of the cutting device. Rigidly connected with the beveled gear 29 is a spur gear 30 which is connected by a suitable train of gearing 31 with a gear 32 on the shaft $7^a$ of the drum 7 of the feeding device. Connected with the gear 32 is gear 33 which meshes with a gear 34 rigidly connected with the cam 12. The ratio of the several gear trains, with relation to each other and to the driving motor, is such as to cause the several parts of the mechanism to operate at the desired relative speeds.

An endless conveyer 35, which is preferably driven from the counter-shaft 19 through a drive chain 36, receives the severed sheet and conveys it to a winding mechanism, arranged at that end of the conveyer remote from the severing device. This winding device preferably consists of a plurality of winding members or mandrels 37 arranged to be brought successively into position to receive a sheet of paper from said conveyer. In the present instance, I have provided four winding elements and these elements are in the form of mandrels, each of which is adapted to grip the forward edge of the sheet of paper and wind the sheet about the mandrel. The several mandrels are mounted for rotation about a common center which is so arranged that when a mandrel is in its uppermost position it will be in a position to receive the sheet from the conveyer. The manner of mounting and operating the several mandrels may take various forms but in the present construction each mandrel comprises a shaft 38 which is journaled at one end in one arm of a supporting structure 39 which in turn is rigidly secured to a main shaft 40 journaled in frame members 41 and 42 and driven by suitable gearing 43 from the counter shaft 19.

Each mandrel is provided with a gripping device, to grip the forward edge of the sheet, and this device may be of any suitable character, either mechanical or pneumatic. A mechanical gripping device is here shown and comprises a gripping member or bar 44 extending lengthwise of the mandrel in a recess 45 formed in the periphery thereof. This gripping bar is pivotally mounted and is preferably carried by a shaft 46 mounted in the recess and provided at its ends with an actuating device, by means of which the gripping member may be rocked about its axis and caused to clamp the edge of the sheet between the bar and the edge of the recess 45. The actuating device is here shown as comprising trip fingers or cams 47 and 48, which are rigidly secured to the ends of the shaft and arranged to engage fixed members or stops, $47^a$ and $48^a$, which are mounted on a fixed part of the machine and so arranged that the finger 47 will engage the stop $47^a$ and will be actuated to move the gripping member or bar into gripping position when the mandrel is in a position to receive the sheet. The gripping bar will be retained in its gripping position until the mandrel has made at least one rotation about its axis, when the finger 48 will engage the stop $48^a$ and will be actuated to release the gripping device and the sheet. The gripping device or bar may be held in its operative position in any suitable manner. Inasmuch as the mandrel and the actuating devices or fingers are rotating constantly, I prefer to use a spring-actuated device which will hold the bar in either its operative or its inoperative position until it is positively removed from that position. As here shown, a spring $44^a$ is connected at one end with the bar and at the other end with the supporting member for the shaft 46. This spring is so arranged that when the bar is moved from one position to the other the spring will be carried across the axis of the bar, thus causing it to hold the bar in that position to which it has been moved.

In the construction here shown the mandrel is provided at each end with a supporting bracket or spider 49 which is mounted on and rotatable with the shaft 38 of the mandrel, the arms of the supporting bracket at that end of the mandrel adjacent to the frame member 42 being of a length less than the radius of the mandrel, so that the finished tube can be removed from the mandrel over this bracket. The bracket at that end of the shaft adjacent to the frame member 41 is arranged between the end of the mandrel and the supporting member 39. In the present construction the shaft 46 of the gripping device is mounted in the arms of these brackets. The several mandrels are rotated about their individual axes by means of pinions 50 rigidly secured to the ends of the respective shafts and meshing with a fixed gear 51 arranged concentrically of the shaft 40. As the shaft 40 is rotated the several mandrels are caused to travel about the axis of that shaft, and at the same time the respective mandrels are rotated about their individual axes at a high rate of speed, the arrangement preferably being such that each mandrel will make the number of rotations necessary to wind the sheet about the same during the first part of its bodily movement after it has received the sheet. Coöperating with the mandrels, as they wind the sheets, are one or more outside pressure rollers 52 which are so arranged that they will engage the sheet as it is being wound about the mandrel and hold the same in firm, smooth engagement with the mandrel during the winding of the first ply, and with the successive plies of the tube during the remainder of the winding operation, thus causing the successive plies to be pressed firmly into engagement one with the other. These rollers may be mounted in various ways and in various positions with relation to the mandrels, so long as they will bear upon the mandrels during their rotations about their common axis. In the present construction they are mounted between the path of the mandrels and the shaft 40, and are journaled at one end in the supporting structure or frame member 42 and are carried at their other end in a collar 70, which is rotatably mounted upon that portion of the shaft 40 adjacent the end of the mandrel. To hold this collar against rotation with the shaft and thus provide fixed bearings for the rollers 52, I have connected the collar 70, by means of a sleeve 71, with the supporting structure or frame 42 at the opposite end of the machine. The rollers are preferably positively rotated and, to this end, each is provided with a pinion 72 which meshes with a gear 73 rigidly secured to and rotating with the shaft 40. The several sections of each mandrel may be held in engagement with the tapered ends of the sleeve in various ways, but I have herein employed a spring for this purpose.

To permit the finished tubes to be removed from the mandrels, I preferably so construct the mandrels that they may be collapsed, or contracted, to reduce their diameter and thus release the tube therefrom. To accomplish this, each mandrel 37 is made up of a plurality of segmental sections arranged about the shaft and capable of a limited radial movement relative to said shaft. In the present construction, the sections of each mandrel are supported by the corresponding arms of the brackets 49 and are here shown as secured to these brackets by means of projections or pins 54 which extend through openings 55 formed in the ends of the arms of the brackets and elongated radially thereof to permit of the movement of the pins and the sections of the mandrels. Mounted upon the shaft 38 is a sleeve 56 which is held against rotation relative to the shaft, but is capable of movement longitudinally thereof. The sleeve has its end portions tapered, as shown at 57 and 58, and the end portions of the segmental sections of the mandrel are shaped to correspond to the taper of the respective portions of the sleeve, the intermediate portions of the sections being so shaped that they are out of engagement with the sleeve. As here shown, the supporting pins or projections 54 are mounted in slide blocks 75, which are mounted in the openings 55 in the respective arms of the spider and are provided with guide pins 76, about which are coiled springs 77, which are confined between the outer walls of the openings 55 and the slide blocks 75, and thus exert an inward pressure upon the slide blocks and the sections of the mandrels, which serve to hold these sections firmly in engagement with the beveled or tapered portions of the sleeve. Thus, when the sleeve is in its innermost position, as shown in Fig. 4, the sections of the mandrel will be held in their outermost or normal positions, and when the sleeve is moved to the left or partially withdrawn from the mandrel, the springs will move the sections of the mandrel inwardly, thus contracting the mandrel and reducing its diameter sufficiently to release the tube which has been wound about the same and permit it to be easily slipped from the mandrel. Preferably the pins 54 are permanently retained within the slide blocks 75, by providing the same with enlarged heads, or otherwise, to hold the spider against movement with the sleeve 57, but, obviously, the slide block may move upon the pin provided the latter is long enough to prevent it being withdrawn from the block. The lengthwise movement is imparted to the sleeve, to cause the mandrel to be expanded and contracted at the proper times by suitable mechanism, which, in the present machine, consists of grooved collars 59 rotatably mounted on the respective shafts 38 and rigidly secured to the respective sleeves. These collars travel about an annular fixed cam 60 having a circumferential rib 61, which enters the grooves in the several collars. This cam is so shaped that as each mandrel begins its upward movement, after the sheet has been completely wound thereon, the sleeve will be shifted to the left, in Fig. 4, and the mandrel collapsed to release the tube. After the tube has been released from the mandrel it is removed therefrom over that end of the mandrel adjacent to the supporting frame 42. This frame is of such character as to support the ends of the mandrels and permit them to rotate both about the axis of the shaft 40 and about their individual axes, and it is, to this end, provided in its inner face, with a circumferential groove 62 into which project the adjacent ends of the shafts 38 these shafts being preferably provided with rollers 63 to reduce the friction of their contact with the supporting structures. To permit the finished tube to be removed, the supporting structure 42 is broken away on one side, as shown at 64, for a distance sufficient to permit of the passage of the tube.

As the mandrel carrying the finished tube moves upwardly, after the mandrel has been collapsed, the tube is quickly moved lengthwise of the mandrel through the opening 64 in the supporting structure 42. This is preferably accomplished by means of an ejector, which is here shown, in the form of a belt 65, moving lengthwise of the mandrel, and arranged to engage the tube as it hangs loosely on the collapsed mandrel, opposite the opening 64 in the supporting structure 42. This ejecting belt is operated at a very high rate of speed, so that the tube is quickly removed from the mandrel. The belt may be mounted in any suitable manner and is here shown as mounted on pulleys or drums 66 carried by frame members or supporting brackets 67 and is driven through suitable chain gearing 68 from the counter shaft 19.

The operation of the mechanism will be readily understood from the foregoing description of the several parts thereof, and it will be apparent that it is wholly automatic in its operation, and will, without interposition on the part of the operator, feed a web of paper or other material from a roll; apply a cement to certain predetermined portions of the surface of the web; sever the web into sections or sheets, each of which has one end coated with cement and the other end uncoated; deliver the cemented sheet to a winding device, which will grip the edge of the sheet; cause the sheet to be wound tightly about a mandrel to form a tube; then release the tube from the mandrel and eject the tube from the machine. It will further be apparent that the machine will operate at a very high rate of speed, the four mandrels of the winding mechanism operating successively to take the sheets from the conveyer and wind the same, so that four tubes are in the process of completion at all times during the operation of the machine.

Further it will be apparent that the mechanism is of such a character that it will handle webs of various widths, the present machine being designed to receive a web as wide as 112 inches. Further it will be apparent that the tubes may be of various kinds, the present machine being designed to form cylindrical tubes to receive the propellent charges for 5¼ and 8¼ inch howitzers, but obviously the size and the cross sectional shape of the tube can be varied by changing the mandrels, and it will be understood that the terms "tube" and "tubular," as herein employed, are not limited to cylindrical structures.

While I have shown and described one embodiment of my invention, I wish it to be understood that I do not desire to be limited to the details of construction, as various modifications may occur to persons skilled in the art.

Having now fully described my invention, what I claim as new and desire to secure by Letters Patent is:

1. In a mechanism of the character described, means for feeding a web of flexible material from a roll of such material, a device operating intermittently to apply cement to the surface of said web for the entire width thereof as it is fed from said roll, a device operating to sever sections of material from said web, said severing device being so timed with relation to said cement applying device that each section of material severed from said web will have a portion only of its surface coated with cement, and a device to receive said severed sheet and wind the same into tubular form.

2. In a mechanism of the character described, means for feeding a web of flexible material from a roll, a device operating intermittently to apply cement to the surface of said web for the entire width thereof, means for severing successive sections of material from said web, the operation of said severing means being so timed that the web will be severed at the forward edge of the cemented portion thereof and each section of material severed from said web will have the forward portion of its surface coated with cement and the rear portion of its surface uncoated, and a device to receive said severed section of material, and wind the same into tubular form with the uncoated portion thereof outward.

3. In a mechanism of the character described, means for feeding a web of flexible material from a roll, a device operating intermittently to apply cement to the surface of said web across the entire width thereof, means for severing successive sections of material from said web after the cement has been applied thereto and along a transverse line at the edge of the cemented portion thereof, and means acting on the individual severed sections to wind the same into tubular form.

4. In a mechanism of the character described, means for advancing a web of material with a continuous and uninterrupted movement, and means for acting on said web during such movement to divide the same into sections, and apply cement thereto, and a device to receive the individual sections after the cement has been applied thereto and wind said sections into tubular form.

5. In a mechanism of the character described, means for advancing a web of material with a continuous uninterrupted movement, means acting on said web of material during such movement to divide the same into sections and apply cement thereto, and a plurality of continuously moving winding devices movable successively into a position to receive a section of said continuously moving web, and means for actuating each individual winding device to cause it to wind its sheet into tubular form.

6. In a mechanism of the character described, means for advancing a web of material with a continuous and uninterrupted movement, means acting on said web of material during such movement to divide the same into sections and apply cement thereto, a continuously rotating structure, a plurality of winding devices mounted on said structure and arranged to be moved successively into a position to receive a section of said web of material as the latter moves forwardly, and means for rotating each individual winding device to cause it to wind its sheet into tubular form.

7. In a mechanism of the character described, means for advancing a web of material with a continuous and uninterrupted movement, means acting on said web of material during such movement to divide the same into sections and apply cement thereto, a continuously rotating structure, a plurality of winding devices mounted on said structure and arranged to be moved successively into a position to receive a section of said web of material as the latter moves forwardly, and means for continuously rotating each individual winding device.

8. In a mechanism of the character described, means for advancing a web of material with a continuous and uninterrupted movement, means acting on said web of material during such movement to divide the same into sections and apply cement thereto, a continuously rotating structure, a plurality of winding devices mounted on said structure and arranged to be moved successively into a position to receive a section of said web of material as the latter moves forwardly, means for rotating each individual winding device to cause it to wind its sheet into tubular form, and means for discharging the resulting tube from said winding device without interrupting the movement of said rotating structure.

9. In a mechanism of the character described, means for advancing a web of material with a continuous and uninterrupted movement, and means for acting on said web during such movement to divide the same into sections and apply cement thereto, a continuously rotating structure, a plurality of mandrels carried by said structure and arranged to be brought successively into a position to receive a section of said web of material, means for rotating each mandrel about its individual axis during the rotation of said supporting structure to cause its section of said web to be wound into tubular form, and means for releasing the resulting tube and discharging the same from said mandrel without interrupting the movement of said continuously rotating structure.

10. In a mechanism of the character described, means for advancing a web of material with a continuous and uninterrupted movement, means acting on said web during such movement to divide the same into sections and apply cement thereto, winding mechanism comprising a plurality of mandrels continuously rotatable about a common axis, each of said mandrels being also rotatable about its individual axis and having means to grip the edge of a sheet of said material and to cause it to be wound about the same, means actuated by the movement of each mandrel about said common axis to contract the same and release the resulting tube therefrom, and means to discharge said tube from said mandrel without interrupting the movement of said mandrel.

11. In a mechanism of the character described, a winding device comprising a mandrel, means for imparting continuous bodily movement to said mandrel, said mandrel being arranged to be moved into and out of a position to receive a sheet of flexible material, means for rotating said mandrel to cause said sheet of material to be wound about the same, a gripping device carried by said mandrel and adapted to grip the edge of a sheet of material without interrupting the bodily movement of said mandrel, means actuated by said movement of said mandrel to cause said gripping device to grip said sheet, and other means actuated by the movement of said mandrel to cause said gripping device to release said sheet after said mandrel has made one complete rotation about its axis.

12. In a mechanism of the character described, a winding device comprising a mandrel, means for moving said mandrel into and out of position to receive a sheet of flexible material, means for rotating said mandrel to cause said sheet of material to be wound about the same, a gripping device carried by said mandrel and adapted to grip the edge of the said sheet of material without interrupting the movement of said mandrel, and means controlled by the bodily movement of said mandrel for causing said gripping device to first grip the edge of said sheet of material and to then release the same after said mandrel has made a complete rotation about its axis.

13. In a mechanism of the character described, a winding device comprising a plurality of mandreds mounted to rotate about a common axis, means for rotating each of said mandrels about its individual axis, a gripping device carried by each of said mandrels to grip the edge of a sheet of flexible material to cause the same to be wrapped around said mandrels as the latter rotates about its individual axis, a tripping device connected with said gripping device and fixed stops to engage said tripping device to actuate said gripping device.

14. In a mechanism of the character described, frame members, a supporting structure rotatably mounted between said frame members, a mandrel carried by said structure, means for rotating said mandrel to cause a sheet of material to be wrapped about the same, and means for releasing the resulting tube from said mandrel, one of said frame members having an opening with which said mandrel registers during the rotation of said supporting structure, and through which the tube may be discharged from said mandrel.

15. In a mechanism of the character described, frame members, a supporting structure rotatably mounted between said frame members, a mandrel carried by said structure, means for rotating said mandrel to cause a sheet of material to be wrapped about the same, means for releasing the resulting tube from said mandrel, one of said frame members having an opening with which said mandrel registers during the rotation of said supporting structure, and an ejecting device to act on said tube while said mandrel is in line with said opening to discharge the tube from the mandrel through said opening.

16. In a mechanism of the character described, frame members, a supporting structure rotatably mounted between said frame members, means for continuously rotating said supporting structure, a mandrel carried by said structure, means for rotating said mandrel to cause a sheet of material to be wrapped about the same, means for releasing the resulting tube from said mandrel, one of said frame members having an opening with which said mandrel registers during the rotation of said supporting structure, and an ejecting device to act on said tube while said mandrel is in line with said opening without interrupting the movement of said supporting structure to discharge the tube from the mandrel through said opening.

17. In a mechanism of the character described, frame members, a supporting structure rotatably mounted between said frame members, means for continuously rotating said supporting structure, a mandrel carried by said structure, means for rotating said mandrel to cause a sheet of material to be wrapped about the same, means for releasing the resulting tube from said mandrel, and an ejecting device to act on said tube without interrupting the movement of said supporting structure to discharge the tube from said mandrel.

18. In a mechanism of the character described, frame members, a supporting structure rotatably mounted between said frame members, means for continuously rotating said supporting structure, a mandrel carried by said structure, means for rotating said mandrel to cause a sheet of material to be wrapped about the same, means for releasing the resulting tube from said mandrel, and an ejecting device arranged adjacent to the path of said mandrel and between the ends thereof and having a portion moving in the direction of the length of said mandrel to engage said tube and discharge the same from said mandrel.

19. In a mechanism of the character described, frame members, a supporting structure rotatably mounted between said frame members, a mandrel carried by said structure, means for rotating said mandrel to cause a sheet of material to be wrapped about the same, means for releasing the resulting tube from said mandrel, and an ejecting device having a portion moving in the direction of the length of said mandrel and arranged to engage the tube on said mandrel between the ends thereof, and discharge the same from said mandrel.

20. In a mechanism of the character described, a winding device comprising frame members, a supporting structure rotatably mounted between said frame members, and mandrels carried by said supporting structure, one of said frame members constituting a support for the adjacent ends of said mandrels and having an opening with which said mandrels will successively register and through which a structure formed on said mandrel may be discharged.

21. In a mechanism of the character described, a mandrel mounted for movement into and out of a position to receive a sheet of flexible material, means for rotating said mandrel to wind said sheet of material about the same, means to release the resulting tube from said mandrel, and an ejecting device to engage the outer surface of said tube and remove the same lengthwise from said mandrel.

22. In a mechanism of the character described, a mandrel mounted for movement into and out of a position to receive a sheet of flexible material, means for rotating said mandrel to wind said sheet of material about the same, means to release the resulting tube from said mandrel, and an ejecting device having a part movable in the direction of the length of said mandrel, and arranged to frictionally engage the outer surface of said tube to discharge the same from said mandrel.

23. In a mechanism of the character described, a winding device comprising frame members, a shaft journaled in said frame members, a supporting structure carried by said shaft adjacent to one of said frame members, mandrels carried by said supporting structure, the other of said frame members having means to support the adjacent ends of said mandreds and having an opening with which said mandrels will register successively.

24. In a mechanism of the character described, a winding device comprising a revoluble supporting structure, a plurality of mandrels each comprising a plurality of longitudinal sections, and an actuating member arranged within said sections and movable longitudinally thereof to impart radial movement to said sections, means for rotating said mandrels about their individual axes, and an annular cam arranged adjacent to one end of said revoluble supporting structure and near the path of travel of said mandrels, the actuating member of each mandrel having a part arranged normally in engagement with said cam whereby longitudinal movement will be imparted to said actuating member as the mandrel revolves about the axis of said supporting structure.

25. In a mechanism of the character described, a winding device comprising a revoluble supporting structure, a plurality of mandrels comprising a plurality of longitudinal sections, and an actuating member arranged in said sections and movable longitudinally thereof to impart radial movement to said sections, means for rotating said mandrels about their individual axes, and an annular cam arranged adjacent to one end of said revoluble supporting structure and near the path of travel of said mandrel, the actuating member of each mandrel having a part in permanent engagement with said cam whereby said actuating member will be moved first in one direction and then in the other as said mandrel moves about the axis of said supporting structure.

26. In a mechanism of the character described, a winding device comprising a revoluble supporting structure, a plurality of mandrels carried by said structure, each of said mandrels comprising a plurality of longitudinal sections and an actuating member arranged within said sections and movable longitudinally thereof to impart radial movement to said sections, means for rotating said mandrels about their longitudinal axes, and a fixed cam arranged adjacent to said revoluble supporting structure, the actuating member of each mandrel having a part arranged to engage said cam, whereby longitudinal movement will be imparted to said actuating member as the mandrel revolves about the axis of said supporting structure, and an endless conveyer arranged adjacent to the path of travel of said mandrels, and adapted to engage the articles on said mandrels as they pass the same and to move said articles lengthwise of said mandrels.

27. In a mechanism of the character described, a winding device comprising supporting frame members, a supporting structure rotatably mounted between said frame members, a plurality of mandrels carried by said supporting structure, and each consisting of a plurality of longitudinal sections, an actuating member to impart radial movement to said sections, means for rotating said mandrels about their individual axes, a frame member at one end of said mandrels having an opening therein, an ejecting device arranged adjacent to the path of travel of said mandrels and between the ends of said mandrels to engage the tubes on the successive mandrels and discharge the same therefrom through said opening in said frame member, and a fixed actuating device to cause the sections of each mandrel to move inwardly just before said mandrel reaches said ejecting device.

28. In a mechanism of the character described a winding device comprising supporting frame members, a shaft journaled in said frame members, a supporting structure rigidly secured to said shaft, a plurality of mandrels carried by said supporting structure and each consisting of a plurality of longitudinal sections, and an actuating member to impart radial movement to said sections, means for rotating said mandrels about their individual axes, the frame member at one end of said mandrels having an opening therein, a belt arranged adjacent to the path of travel of said mandrel in line with said opening, and a fixed actuating device to cause the sections of each mandrel to move inwardly just before said mandrel reaches said belt.

29. In a mechanism of the character described, a winding device comprising frame members, a shaft journaled in said frame members, a supporting member rigidly secured to said shaft near one of said frame members, a plurality of mandrels each comprising a shaft journaled at one end in said supporting member and having its other end adapted to travel in a guideway in the other frame member, a plurality of longitudinal sections surrounding said shaft, a sleeve mounted on said shaft for rotation therewith and capable of longitudinal movement relative thereto to impart radial movement to said sections, means for rotating said shafts, said last mentioned frame member having an opening therein through which the end of the shaft of each mandrel passes without support to permit the article formed on the same to be removed lengthwise therefrom, means for actuating the sleeve of each mandrel as it approaches said opening to cause said sections to move inwardly, and an ejecting device arranged adjacent to said opening to remove said article from said mandrel through said opening.

30. In a mechanism of the character described, a winding device comprising a mandrel mounted for bodily movement into and out of a position to receive a sheet of flexible material, means for continuously rotating said mandrel about its individual axis, means carried by said mandrel to grip the edge of said sheet of flexible material during the continuous rotation of said mandrel and cause the same to be wrapped about the mandrel as the latter rotates, and a pressure roller arranged to engage said sheet as it is wound about said mandrel and press the same into close contact therewith.

31. In a mechanism of the character described, a winding device comprising a mandrel mounted for bodily movement into and out of a position to receive a sheet of flexible material, means for rotating said mandrel about its individual axis, means carried by said mandrel to grip the edge of said sheet of flexible material and cause the same to be wrapped about the mandrel as the latter rotates, and a series of pressure rollers mounted on fixed axes adjacent to the path of the bodily movement of said mandrel and adapted to be successively engaged by the sheet wound upon said mandrel and press the same into close contact with the mandrel and with the plies of said sheet which have been wound about said mandrel.

32. In a mechanism of the character described, a winding device comprising a plurality of mandrels mounted to rotate about a common axis, means for rotating each of said mandrels about its individual axis, means carried by each of said mandrels for gripping the edge of a sheet of flexible material to cause the same to be wrapped around said mandrel as the latter rotates, and a series of pressure rollers mounted on fixed axes adjacent to the path of rotation of said mandrels about said common axis and adapted to successively engage the sheets that are wound about the respective mandrels, and means for rotating each pressure roller about its individual axis.

33. In a mechanism of the character described, a winding device comprising a plurality of mandrels mounted to rotate about a common axis, means for rotating each of said mandrels about its individual axis, means carried by each of said mandrels for gripping the edge of a sheet of flexible material to cause the same to be wrapped around said mandrel as the latter rotates, and a series of pressure rollers mounted on fixed axes within the path described by said mandrels as they move about their common axis, and arranged to be successively engaged by the material on each mandrel.

34. In a mechanism of the character described a winding device comprising a main shaft, a supporting structure carried by said shaft, a plurality of mandrels carried by said supporting structure for rotation about said common shaft, mean for rotating each of said mandrels about its individual axis, means carried by each mandrel for gripping the edge of a sheet of flexible material and causing the same to be wound about the mandrel as the latter rotates, a supporting member mounted on said shaft near said supporting structure, means for connecting said supporting member with a fixed part of the mechanism to hold the same against rotation with said shaft, and pressure rollers journaled at one end in said supporting member and at the other end in a fixed part of said mechanism, and arranged adjacent to the path through which said mandrels move in their travel about said shaft.

In testimony whereof, I affix my signature hereto.

AXEL C. V. MALM.